(12) United States Patent
Hou et al.

(10) Patent No.: US 10,015,245 B2
(45) Date of Patent: Jul. 3, 2018

(54) METHOD AND APPARATUS FOR GROUPING SMART DEVICE IN SMART HOME SYSTEM

(71) Applicant: Xiaomi Inc., Beijing (CN)

(72) Inventors: Enxing Hou, Beijing (CN); Deguo Meng, Beijing (CN); Changbing Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 207 days.

(21) Appl. No.: 15/002,181

(22) Filed: Jan. 20, 2016

(65) Prior Publication Data

US 2016/0316007 A1    Oct. 27, 2016

(30) Foreign Application Priority Data

Apr. 27, 2015    (CN) .......................... 2015 1 0206050

(51) Int. Cl.
*H04L 29/08*        (2006.01)
*H04L 12/28*        (2006.01)

(52) U.S. Cl.
CPC ...... *H04L 67/1053* (2013.01); *H04L 12/2803* (2013.01); *H04L 67/18* (2013.01)

(58) Field of Classification Search
CPC .. H04L 67/1053; H04L 67/18; H04L 12/2803
USPC ................. 709/203, 219, 220, 226, 230, 248
See application file for complete search history.

(56) References Cited

U.S. PATENT DOCUMENTS

| 7,644,144 B1 * | 1/2010 | Horvitz ................. G06Q 10/10 709/203 |
| 8,676,937 B2 * | 3/2014 | Rapaport ................ H04L 51/32 709/219 |
| 8,762,479 B2 * | 6/2014 | Gladwin ............... H04L 65/602 709/214 |
| 8,843,853 B1 * | 9/2014 | Smoak .................. G06F 3/0482 715/788 |
| 8,990,328 B1 * | 3/2015 | Grigsby .............. H04L 12/1845 709/203 |

(Continued)

FOREIGN PATENT DOCUMENTS

| CN | 102447773 A | 5/2012 |
| CN | 102968444 A | 3/2013 |

(Continued)

OTHER PUBLICATIONS

International Search Report dated Feb. 14, 2016 for International Application No. PCT/2015/090425, 5 pages.

(Continued)

*Primary Examiner* — Michael Y Won
(74) *Attorney, Agent, or Firm* — Brinks, Gilson & Lione

(57) ABSTRACT

A method and apparatus are provided for grouping a smart device in a smart home system. The method includes: determining a preset target group corresponding to the smart device according to historic operation information of the smart device; and grouping the smart device according to the preset target group. Thus, the preset target group corresponding to the smart device is determined according to historic operation information of the smart device. As such, the preset target group of the smart device is automatically determined, and the smart device is grouped according to the preset group.

20 Claims, 9 Drawing Sheets

(56) References Cited

U.S. PATENT DOCUMENTS

| | | | |
|---|---|---|---|
| 9,363,221 B1* | 6/2016 | Ozog | H04L 67/306 |
| 2006/0168178 A1 | 7/2006 | Hwang et al. | |
| 2007/0245368 A1 | 10/2007 | Kawai | |
| 2008/0209034 A1 | 8/2008 | Shin et al. | |
| 2011/0106279 A1 | 5/2011 | Cho et al. | |
| 2012/0246267 A1* | 9/2012 | Mallet | G06Q 50/01 |
| | | | 709/217 |
| 2012/0284328 A1* | 11/2012 | Chung | H04L 67/2833 |
| | | | 709/203 |
| 2014/0005809 A1 | 1/2014 | Frei et al. | |
| 2014/0324973 A1 | 10/2014 | Goel et al. | |
| 2015/0094098 A1* | 4/2015 | Stern | H04W 4/043 |
| | | | 455/456.3 |
| 2015/0113418 A1 | 4/2015 | Sasaki et al. | |
| 2016/0261425 A1* | 9/2016 | Horton | G05B 15/02 |
| 2017/0080346 A1* | 3/2017 | Abbas | A63F 13/825 |
| 2017/0192402 A1* | 7/2017 | Karp | G05B 17/02 |

FOREIGN PATENT DOCUMENTS

| | | |
|---|---|---|
| CN | 104516317 A | 4/2015 |
| JP | 2012-023824 A | 2/2012 |
| JP | 2013-040754 A | 2/2013 |
| JP | 2013-106414 A | 5/2013 |
| JP | 2014-134917 | 7/2014 |
| RU | 2012 146 013 A | 5/2014 |
| WO | WO 2009/127998 A1 | 10/2009 |
| WO | WO 2013/069671 A1 | 5/2013 |
| WO | WO 2014/182665 A2 | 11/2014 |
| WO | WO 2014/183365 A1 | 11/2014 |

OTHER PUBLICATIONS

English Translation of International Search Report dated Feb. 14, 2016 for International Application No. PCT/CN2015/090425, 4 pages.

Extended European Search Report dated Jul. 29, 2016 for European Application No. 16161798.0, 8 pages.

Office Action dated Mar. 3, 2017 for Chinese Application No. 201510206050.X, 8 pages.

Office Action dated Jul. 21, 2017 for Japanese Application No. 2017-514776, 3 pages.

Office Action dated Sep. 11, 2017 for Korean Application No. 10-2015-7033195, 7 pages.

Office Action dated Feb. 14, 2017 for Russian Application No. 2015152820/08, 12 pages.

* cited by examiner

METHOD AND APPARATUS FOR GROUPING SMART DEVICE IN SMART HOME SYSTEM

CROSS-REFERENCE TO RELATED APPLICATION

This application is based upon and claims priority to Chinese Patent Application No. 201510206050.X, filed on Apr. 27, 2015, the entire contents of which are incorporated herein by reference.

TECHNICAL FIELD

The present disclosure relates to the field of smart device technologies, and more particularly, to a method and an apparatus for grouping a smart device in a smart home system.

BACKGROUND

As technology is now more widely accepted and used in people's lives, consumers are becoming more and more aware of smart hardware and purchasing consumer electronic products with smart hardware capabilities. For these kind of products, device statuses can be viewed and control commands can be performed remotely via applications installed on mobile phones. As the number of devices increases, if the devices are not grouped reasonably, then when a user takes out a mobile phone and starts an application to remotely view or control the devices, the user will typically see a list including a large number of devices and may have to spend time finding a desired device in the list.

Typically, the application's developers will allow the user to classify his/her own smart devices according to rooms or device types. For example, in the application's interface, the user first sees different room names. After the user clicks on a certain room, the application may demonstrate those smart devices that are arranged in the selected room. Such a solution is currently common, in which it is necessary for the user to manually group his/her own devices according to the rooms.

SUMMARY

Embodiments of the present disclosure provide a method and an apparatus for grouping a smart device in a smart home system, so as to achieve that the smart device can be automatically grouped according to the user's use habit.

According to a first aspect of embodiments of the present disclosure, a method for grouping a smart device in a smart home system is provided, which may be applied in a server. The method includes: determining a preset target group corresponding to the smart device according to historic operation information of the smart device; and grouping the smart device according to the preset target group.

According to a second aspect of embodiments of the present disclosure, an apparatus for grouping a smart device in a smart home system is provided, which may be applied in a server. The apparatus includes: a determining module, configured to determine a preset target group corresponding to the smart device according to historic operation information of the smart device; and a grouping module, configured to group the smart device according to the preset target group.

According to a third aspect of embodiments of the present disclosure, an apparatus for grouping a smart device in a smart home system is provided. The apparatus includes: a processor; and a memory for storing instructions executable by the processor. The processor is configured to: determine a preset target group corresponding to the smart device according to historic operation information of the smart device; and group the smart device according to the preset target group.

According to a fourth aspect of embodiments of the present disclosure, a non-transitory computer-readable storage medium is provided. The non-transitory computer-readable storage medium have stored therein instructions that, when executed by one or more processors of an apparatus, cause the apparatus to perform: determining a preset target group corresponding to the smart device according to historic operation information of the smart device; and grouping the smart device according to the preset target group.

It shall be appreciated that the above general description and the detailed description hereinafter are only illustrative and interpretative, but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the description, serve to explain the principles of the present disclosure.

DETAILED DESCRIPTION

Figure 1:
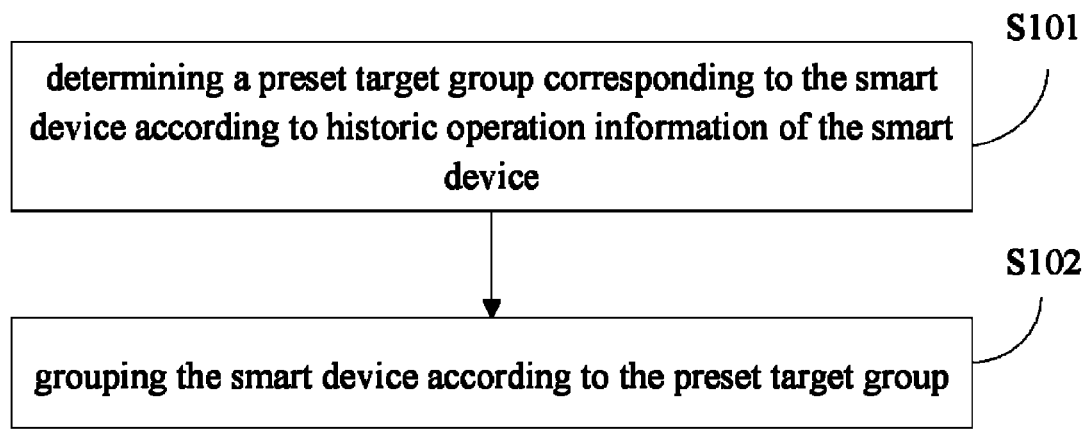
FIG. 1 is a flowchart illustrating a method for grouping a smart device in a smart home system according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

The solutions provided in the embodiments of the present disclosure may achieve at least the following beneficial effects. The solutions can achieve that according to the user's daily operation habit of the smart device, the non-grouped smart device can be automatically grouped or the grouped smart device can be regrouped. As such, the user doesn't need to manually group smart devices one by one, thereby reducing the user's operations and improving the user's experience.

A smart home system uses advanced computer technology, network communication technology, integrated wiring technology, integrates individual needs in accordance with the principles of ergonomics, and organically combines various subsystems related to home life such as security, lighting control, curtain control, gas valve control, information appliances, scene linkage, floor heating and the like, so as to realize a brand new "people-oriented" experience of home life through a comprehensive intelligent control and management via network. In the smart home system, generally, smart devices' statuses can be viewed and control commands can be performed remotely via applications installed on a terminal. After the number of smart devices increases, if the devices are not grouped reasonably, then when the user takes out a mobile phone and starts the application, the user will face a list including a large number of devices and usually spend fairly long time to find a concerned smart device. For example, the smart home system may include one or more smart devices, a smart hub connecting to the one or more smart devices, and a terminal connected to the smart hub.

FIG. 1 is a flowchart illustrating a method for grouping a smart device in a smart home system according to an exemplary embodiment. As shown in FIG. 1, the above method for grouping a smart device may be applied in a server of the smart home system, and may include the following steps. The server may be included in a smart router device, a server computer, or a controller that controls the smart home system.

In step S101, a preset target group corresponding to the smart device is determined according to historic operation information of the smart device. The historic information may include any operations of the smart device that may be recorded. For example, the historic information may include at least one of the following: an initial time when the smart device is turned on each day, an end time when the smart device is turned off on each day, a number of times the smart device is manipulated during a first preset time period, an amount of energy the smart device consumed during a second preset time period, an interaction between the smart device and the user, and an interaction between the smart device and the smart home system, or any other device-specific operations defined by a user. Here, the first preset time period and the second preset time period may be the same or may be different, which may be set by the user using the smart device or the terminal. The user may manipulate the smart device by adjusting one or more settings of the smart device. The historic operation information may be recorded by the smart device. Alternatively or additionally, the historic operation information may be recorded by a home based smart hub working with the smart device. The home based smart hub may include the server of the smart home system.

In step S102, the smart device is grouped according to the preset target group. The server may group the smart device to the preset target group and assign a group identification number to the smart device, where the group identification number may be stored in at least one of the following: the smart device, the server of the smart home system, and the smart hub.

In the embodiments, the preset target group corresponding to the smart device is determined according to historic operation information of the smart device. As such, the preset target group of the smart device is automatically determined, and the smart device is grouped according to the preset target group. Thus, the user doesn't need to manually determine the group and manually group smart devices, thereby reducing the user's operations and improving the user's experience.

Figure 2:
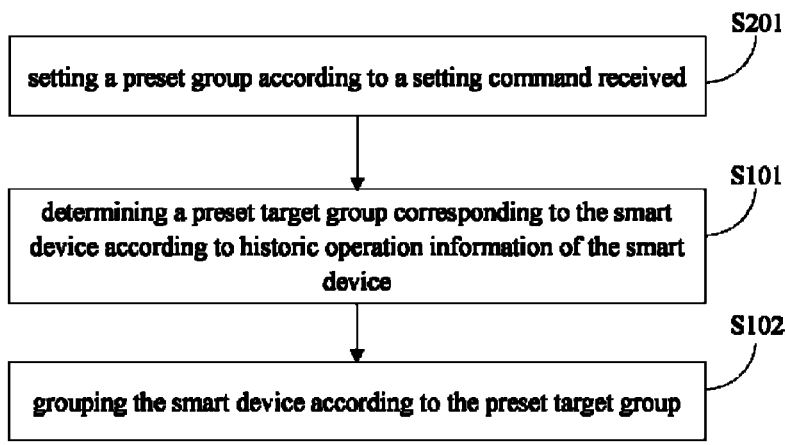
FIG. 2 is a flowchart illustrating another method for grouping a smart device in a smart home system according to an exemplary embodiment.

The preset group may be preset by the smart home system, or may be set by the user according to his/her own needs. If it is set by the user, then as shown in FIG. 2, prior to the step S101, the above method may further include step S201, in which a preset group is set according to a setting command received. Thereby, various needs of the user may be satisfied. For example, the user may, in accordance with the actual needs and according to the room location, set up groups such as a bedroom group, a living room group, a kitchen group, a bathroom group, an office group, etc.

Figure 3:
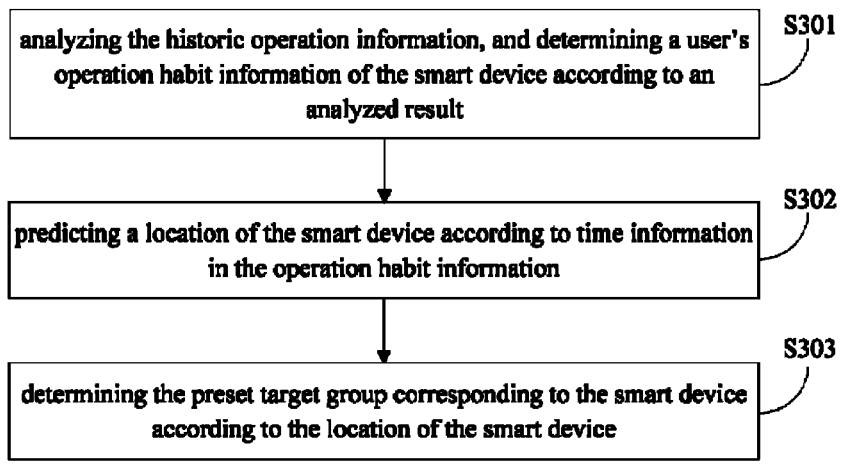
FIG. 3 is a flowchart illustrating an implementation of step S101 according to another exemplary embodiment.

As shown in FIG. 3, in one embodiment, the step S101 includes the following steps S301-S303, which may be implemented at least partially by the server of the smart home system.

In step S301, the historic operation information is analyzed, and user's operation habit information of the smart device is determined according to an analyzed result. In the embodiments, the user's operation habit information may be determined according to the user's historic operation information. For example, from the user's daily historic operation information of the smart device, the time duration during which the user usually operates the smart device may be determined, that is, the user's operation habit information may be determined.

In step S302, a location of the smart device is predicted according to time information in the operation habit information. In the embodiments, the operation habit information may include time information, i.e., the smart device is usually operated at what time, and thereby the likely location of the smart device can be predicted. For example, when it is found that the user often turns off a lamp at around 10:00 p.m., and the lamp is the last one to be closed, then the server may predict that the lamp may belong to the bedroom in the house. When it is found that the user often operates a local curtain during working hours in weekdays, then it may be predicted that the curtain may belong to the office. When it is found that a range hood is often turned on at around 7:00 p.m., then it may be predicted that the range hood may belong to the kitchen.

In step S303, the preset target group corresponding to the smart device is determined according to the location of the smart device. The location of the smart device is corresponding to the preset target group. For example, if the location of the smart device is the kitchen, then the preset group is the kitchen group; if the location is the living room, then the preset group is the living room group; if the location is the office, then the preset group is the office group.

In the embodiments, the above step S102 may be implemented in either one or both of the following two manners.

First Manner

Figure 4:
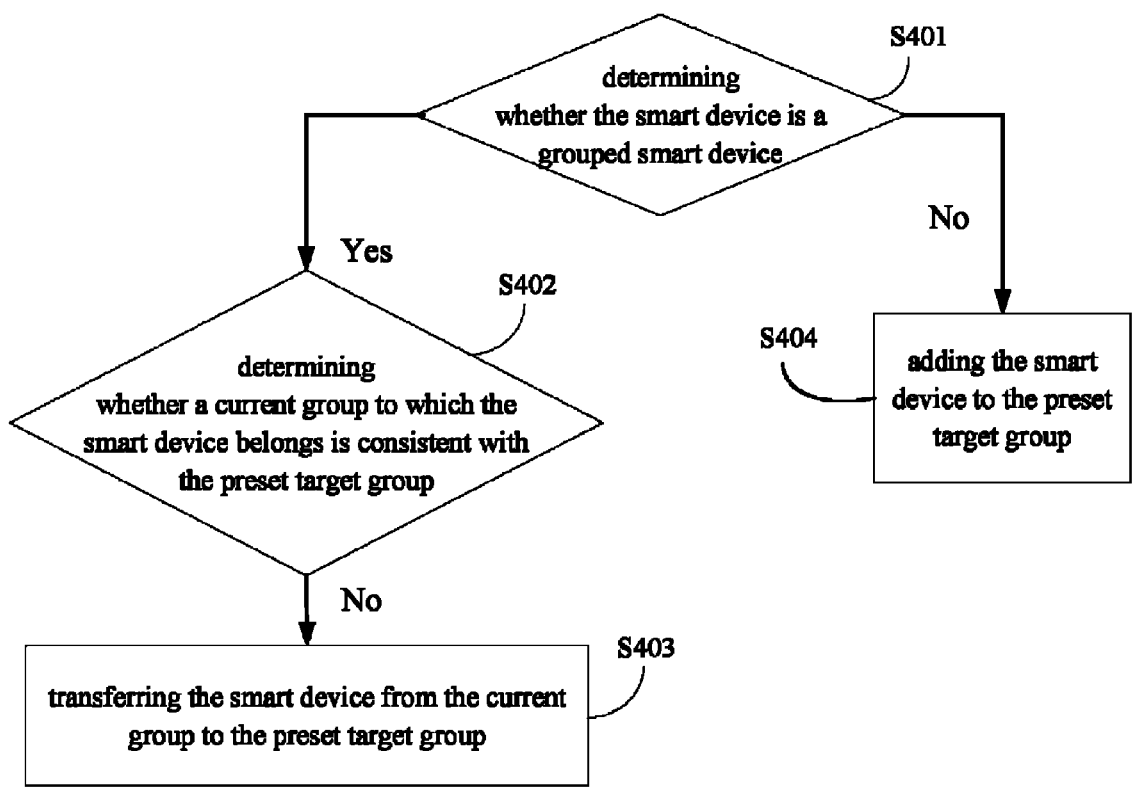
FIG. 4 is a flowchart illustrating an implementation of step S102 according to another exemplary embodiment.

As shown in FIG. 4, in one embodiment, the step S102 includes the following steps S401-S404.

In step S401, it is determined whether the smart device is a grouped smart device. When the smart device is a grouped smart device, proceed to step S402; when the smart device is a non-grouped smart device, proceed to step S404.

In step S402, when the smart device is a grouped smart device, it is determined whether a current group to which the smart device belongs is consistent with the preset target group; if not consistent, proceed to step S403; if consistent, end the process.

In step S403, when a current group to which the smart device belongs is not consistent with the preset target group, the smart device is transferred from the current group to the preset target group. For grouped smart devices, according to the determined preset target group, grouped smart devices can be automatically regrouped. As such, the grouping of smart devices is constantly updated according to the user's historic operation information, such that the grouping of smart devices is more adapted for the user's needs, facilitating the user to quickly find and operate the concerned smart device from a large number of smart devices in the device list.

In step S404, when the smart device is a non-grouped smart device, the smart device is added to the preset target group. For non-grouped smart devices, they can be automatically grouped according to the determined preset target group. As such, the user doesn't need to manually group smart devices one by one, thereby reducing the user's operations and improving the user's experience.

Second Manner

Figure 5:
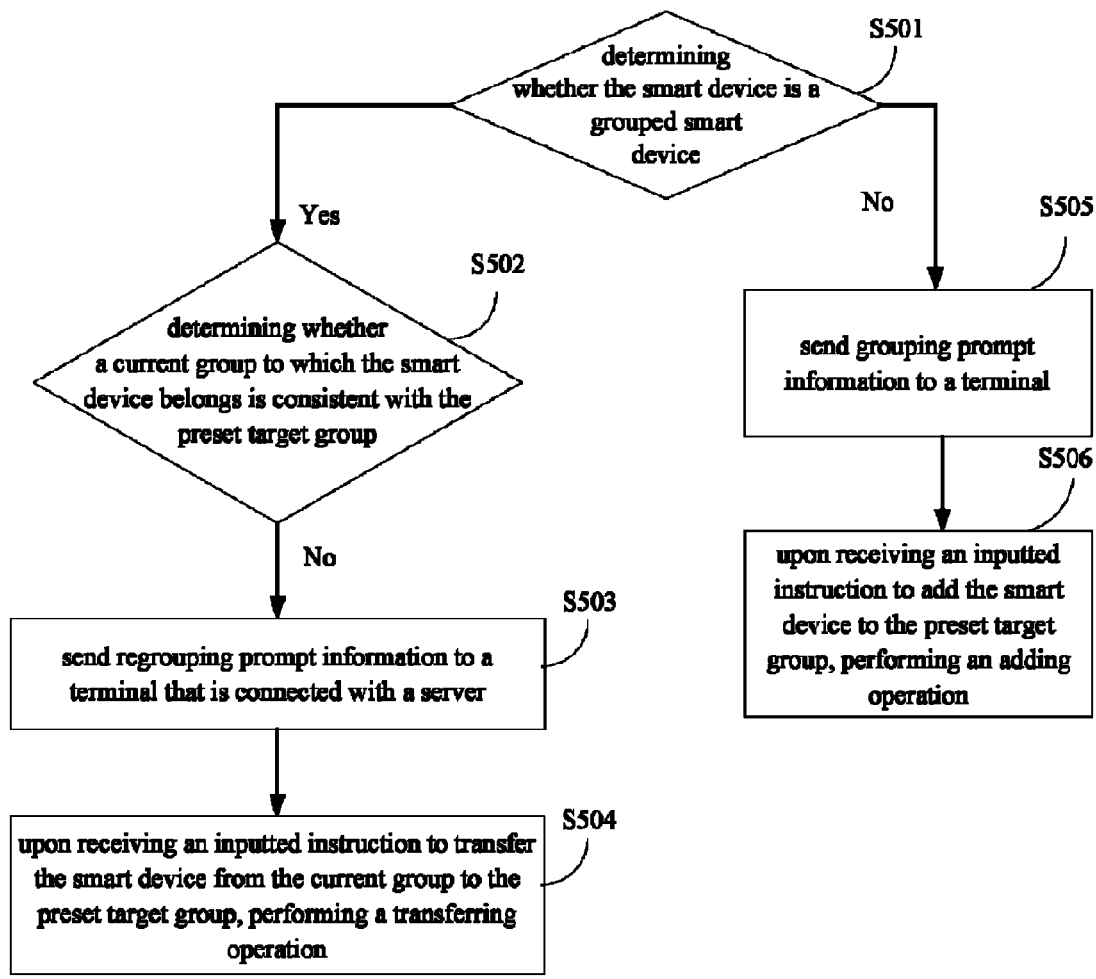
FIG. 5 is a flowchart illustrating another implementation of step S102 according to another exemplary embodiment.

As shown in FIG. 5, in one embodiment, the step S102 includes the following steps S501-S506.

In step S501, it is determined whether the smart device is a grouped smart device. When the smart device is a grouped smart device, proceed to step S502; when the smart device is a non-grouped smart device, proceed to step S505.

In step S502, when the smart device is a grouped smart device, it is determined whether a current group to which the smart device belongs is consistent with the preset target group; if not consistent, proceed to step S503; if consistent, end the process.

In step S503, when a current group to which the smart device belongs is not consistent with the preset target group, regrouping prompt information is outputted to prompt a user whether to transfer the smart device from the current group to the preset target group.

For grouped smart devices, according to the determined preset target group, the user is prompted to regroup the grouped smart devices, and when the user selects to regroup, the smart devices can be regrouped. As such, whether to regroup smart devices is determined according to the user's selection, such that the grouping of smart devices is more adapted for the user's needs, facilitating the user to quickly find and operate the concerned smart device from a large number of smart devices in the device list.

In step S504, upon receiving an inputted instruction to transfer the smart device from the current group to the preset target group, a transferring operation corresponding to the instruction is performed.

In step S505, when the smart device is a non-grouped smart device, grouping prompt information is outputted to prompt the user whether to add the smart device to the preset target group.

The grouping prompt information may be sent to a terminal device that is bound to the smart home system, and then displayed to the user via the terminal device. Alternatively, the grouping prompt information may be displayed on a user interface of the smart home system for the user to view.

In step S506, upon receiving an inputted instruction to add the smart device to the preset target group, an adding operation corresponding to the instruction is performed.

As such, according to the determined preset target group, the user is prompted to group the non-grouped smart devices, and when the user selects to group, the smart devices can be automatically grouped according to the preset target group. As such, whether to group smart devices is determined according to the user's selection, such that the grouping of smart devices is more adapted for the user's needs, not only reducing the user's operations, but also facilitating the user to quickly find and operate the concerned smart device from a large number of smart devices in the device list.

Figure 6:
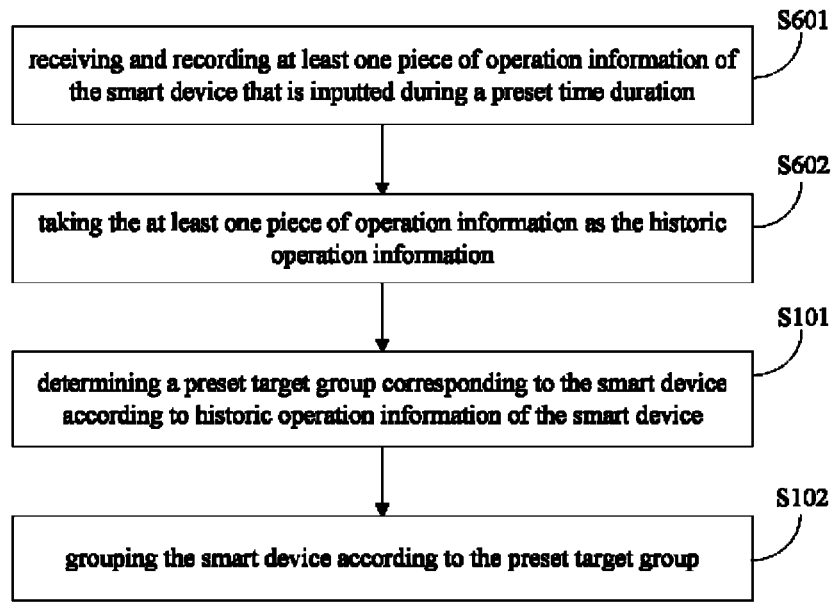
FIG. 6 is a flowchart illustrating still another method for grouping a smart device in a smart home system according to another exemplary embodiment.

As shown in FIG. 6, in one embodiment, prior to the step S102, the method may further include the following steps S601-S602.

In step S601, at least one piece of operation information of the smart device that is inputted during a preset time duration is received and recorded.

In step S602, the at least one piece of operation information is taken as the historic operation information.

In the above embodiment, the user's at least one piece of operation information of the smart device during a preset time duration is taken as the historic operation information. For example, the user's operation information of the smart device within five days is taken as the historic record. As such, the preset target group can be determined according to the operation information within the five days. The above preset time duration may be preset by the system, or may be set by the user according to his/her own needs.

Figure 7:
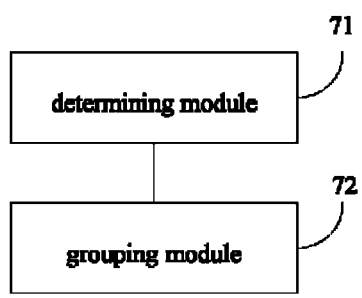
FIG. 7 is a block diagram illustrating an apparatus for grouping a smart device in a smart home system according to an exemplary embodiment.

FIG. 7 is a block diagram illustrating an apparatus for grouping a smart device in a smart home system according to an exemplary embodiment. As shown in FIG. 7, the apparatus for grouping a smart device in a smart home system according to an exemplary embodiment of the present disclosure is applied in a server, and includes:

a determining module 71, configured to determine a preset target group corresponding to the smart device according to recorded historic operation information of the smart device; and a grouping module 72, configured to group the smart device according to the preset target group.

Figure 8:
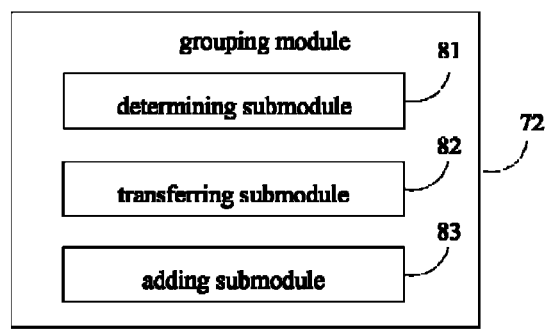
FIG. 8 is a block diagram illustrating a grouping module in an apparatus for grouping a smart device in a smart home system according to another exemplary embodiment.

As shown in FIG. 8, in one embodiment, the grouping module 72 includes:

a determining submodule 81, configured to determine whether the smart device is a grouped smart device;

a transferring submodule 82, configured to, when the smart device is a grouped smart device, transfer the smart device from the current group to the preset target group; and an adding submodule 83, configured to, when the smart device is a non-grouped smart device, add the smart device to the preset target group.

Figure 9:
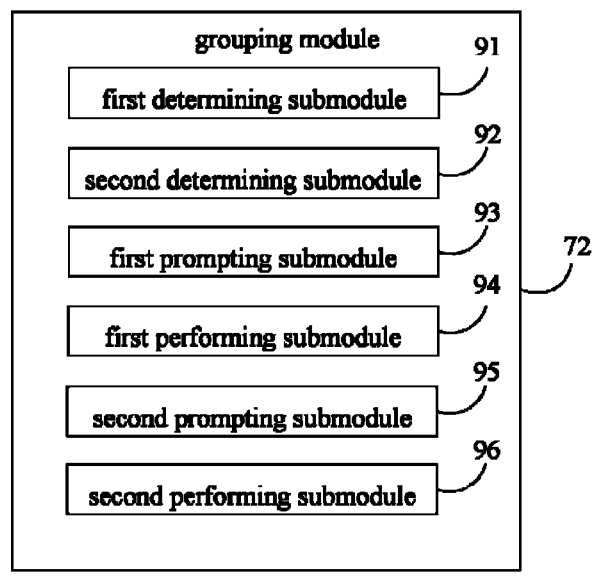
FIG. 9 is a block diagram illustrating another grouping module in an apparatus for grouping a smart device in a smart home system according to another exemplary embodiment.

As shown in FIG. 9, in another embodiment, the grouping module 72 includes:

a first determining submodule 91, configured to determine whether the smart device is a grouped smart device;

a second determining submodule 92, configured to, when the smart device is a grouped smart device, determine whether a current group to which the smart device belongs is consistent with the preset target group;

a first prompting submodule 93, configured to, when a current group to which the smart device belongs is not consistent with the preset target group, output regrouping prompt information to prompt a user whether to transfer the smart device from the current group to the preset target group;

a first performing submodule 94, configured to, upon receiving an inputted instruction to transfer the smart device from the current group to the preset target group, perform a transferring operation corresponding to the instruction;

a second prompting submodule 95, configured to, when the smart device is a non-grouped smart device, output grouping prompt information to prompt the user whether to add the smart device to the preset target group; and a second performing submodule 96, configured to, upon receiving an inputted instruction to add the smart device to the preset target group, perform an adding operation corresponding to the instruction.

Figure 10:
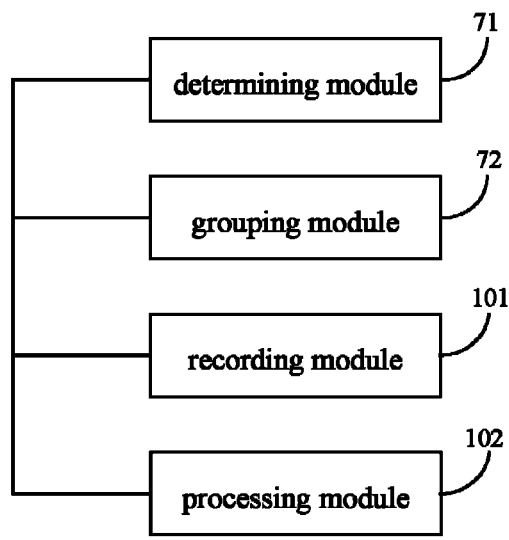
FIG. 10 is a block diagram illustrating still another apparatus for grouping a smart device in a smart home system according to another exemplary embodiment.

As shown in FIG. 10, in one embodiment, the apparatus further includes:

a recording module 101, configured to receive and record at least one piece of operation information of the smart device that is inputted during a preset time duration; and a processing module 102, configured to take the at least one piece of operation information as the historic operation information.

Figure 11:
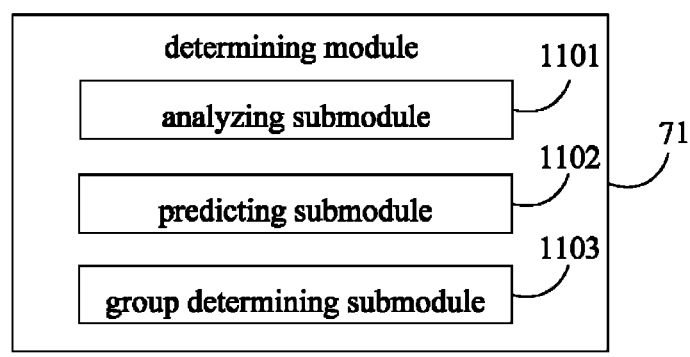
FIG. 11 is a structural diagram illustrating a determining module in an apparatus for grouping a smart device in a smart home system according to another exemplary embodiment.

As shown in FIG. 11, in one embodiment, the determining module 71 includes:

an analyzing submodule 1101, configured to analyze the historic operation information, and determine user's operation habit information of the smart device according to an analyzed result;

a predicting submodule 1102, configured to predict a location of the smart device according to time information in the operation habit information; and a group determining submodule 1103, configured to determine the preset target group corresponding to the smart device according to the location of the smart device.

Figure 12:
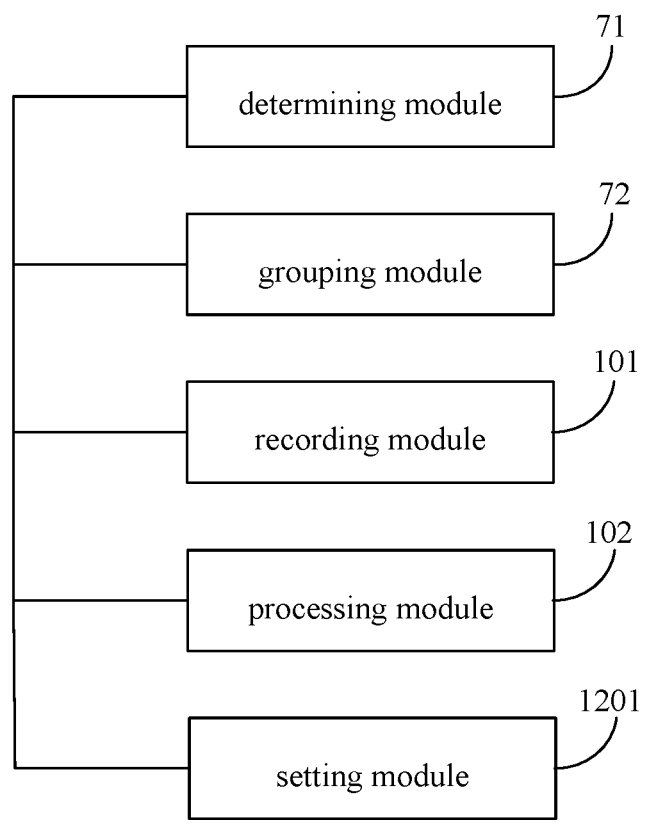
FIG. 12 is a block diagram illustrating still another apparatus for grouping a smart device in a smart home system according to another exemplary embodiment.

As shown in FIG. 12, in one embodiment, the apparatus further includes:

a setting module 1201, configured to set a preset group according to a setting command received.

According to a third aspect of embodiments of the present disclosure, an apparatus for grouping a smart device in a smart home system is provided. The apparatus includes: a processor and a memory for storing instructions executable by the processor. The processor is configured to performing acts including: determine a preset target group corresponding to the smart device according to recorded historic operation information of the smart device; and group the smart device according to the preset target group.

The processor may further be configured to perform: determining whether the smart device is a grouped smart device. When the smart device is determined to be a grouped smart device, the server may determine whether a current group to which the smart device belongs is consistent with the preset target group, and if not, the server may transfer the smart device from the current group to the preset target group. When the smart device is determined to be a non-grouped smart device, the server may add the smart device to the preset target group.

Alternatively or additionally, when the smart device is determined to be a grouped smart device, the server may determine whether a current group to which the smart device belongs is consistent with the preset target group, and if not, the server may instruct a smart phone to output regrouping prompt information to prompt a user to select whether or not to transfer the smart device from the current group to the preset target group. Upon receiving an inputted instruction to transfer the smart device from the current group to the preset target group, the server may perform a transferring operation corresponding to the instruction. When the smart device is determined to be a non-grouped smart device, the server may instruct a smart phone to output grouping prompt information to prompt the user to select whether or not to add the smart device to the preset target group. Upon receiving an inputted instruction to add the smart device to the preset target group, the server may perform an adding operation corresponding to the instruction.

The processor may further be configured to perform acts including: prior to determining a preset target group corresponding to the smart device according to recorded historic operation information of the smart device, further including: receiving and recording at least one piece of operation information of the smart device that is inputted during a preset time duration; and taking the at least one piece of operation information as the historic operation information.

The processor may further be configured to perform acts including: determining a preset target group corresponding to the smart device according to recorded historic operation information of the smart device includes: analyzing the historic operation information, and determining user's operation habit information of the smart device according to an analyzed result; predicting a location of the smart device according to time information in the operation habit information; and determining the preset target group corresponding to the smart device according to the location of the smart device.

The processor may further be configured to perform acts including: set a preset group according to a setting command received.

Figure 13:
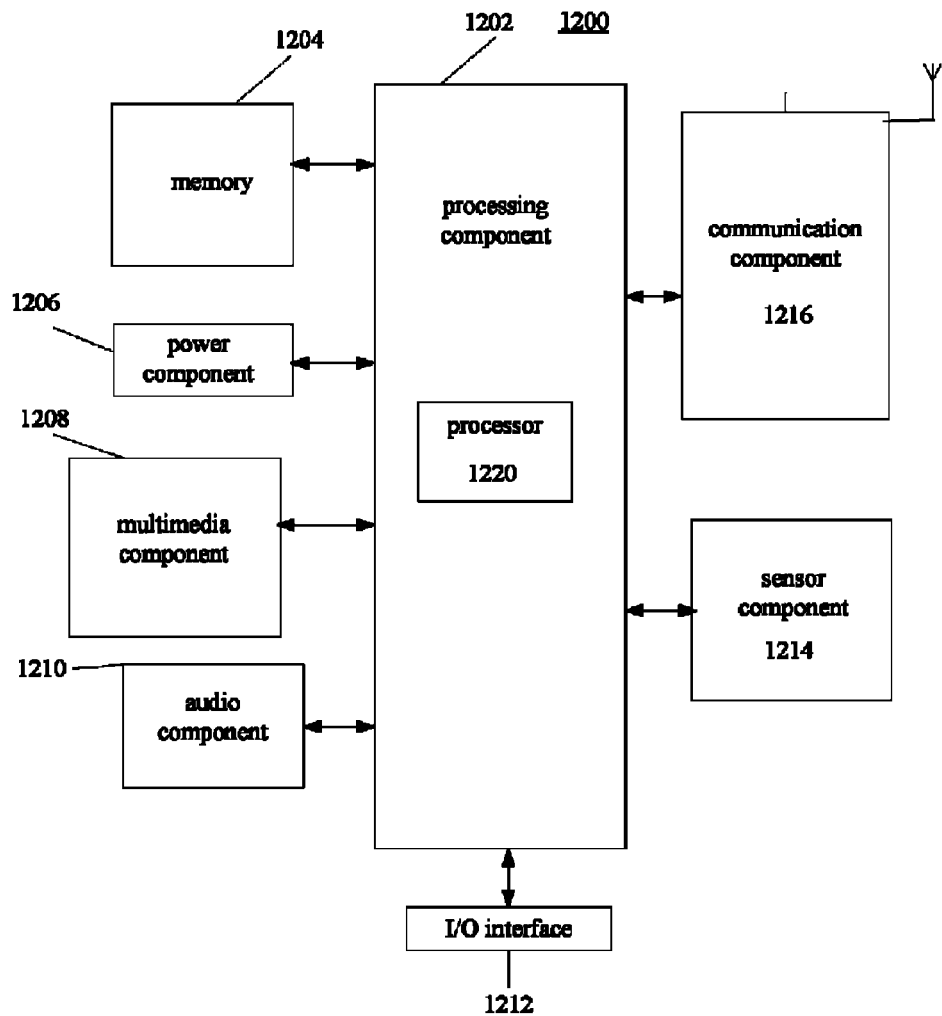
FIG. 13 is a block diagram illustrating an apparatus adapted for grouping a smart device in a smart home system according to an exemplary embodiment.

FIG. 13 is a block diagram illustrating an apparatus 1200 for grouping a smart device according to an exemplary embodiment. The apparatus may be implemented in a terminal device. For example, the apparatus 1200 may be a mobile phone, a computer, a digital broadcast terminal, a messaging device, a gaming console, a tablet, a medical device, exercise equipment, a personal digital assistant, and the like.

Referring to FIG. 13, the apparatus 1200 may include one or more of the following circuitry components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the apparatus 1200, such as the operations associated with display, telephone calls, data communications, camera operations, and recording operations. The processing component 1202 may include one or more processors 1220 to execute instructions to perform all or a part of the steps in the above-described methods. In addition, the processing component 1202 may include one or more modules which facilitate the interaction between the processing component 1202 and other components. For example, the processing component 1202 may include a multimedia module to facilitate the interaction between the multimedia component 1208 and the processing component 1202.

The memory 1204 is configured to store various types of data to support the operations of the apparatus 1200. Examples of such data include instructions for any application or method operated on the apparatus 1200, contact data, phonebook data, messages, pictures, videos, and the like. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the apparatus 1200. The power component 1206 may include a power management system, one or more power supplies, and other components associated with the generation, management, and distribution of power in the apparatus 1200.

The multimedia component 1208 includes a screen providing an output interface between the apparatus 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and/or the rear camera may receive external multimedia data while the apparatus 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone (MIC) configured to receive an external audio signal when the apparatus 1200 is in an operation mode, such as a call mode, a recording mode, or a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and a peripheral interface module, such as a keyboard, a click wheel, a button, or the like. The buttons may include, but are not limited to, a home button, a volume button, a starting button, and a locking button.

The sensor component 1214 includes one or more sensors to provide status assessments of various aspects of the apparatus 1200. For example, the sensor component 1214 may detect an open/closed status of the apparatus 1200, relative positioning of components, e.g., the display and the keypad, of the apparatus 1200, a change in position of the apparatus 1200 or a component of the apparatus 1200, a presence or absence of user contact with the apparatus 1200, an orientation or an acceleration/deceleration of the apparatus 1200, and a change in temperature of the apparatus 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communications, wired or wirelessly, between the apparatus 1200 and other devices. The apparatus 1200 may access a wireless network based on a communication standard, such as WiFi, 2G, or 3G, or a combination thereof. In one exemplary embodiment, the communication component 1216 receives a broadcast signal or broadcast associated notification information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, such as included in the memory 1204, executable by the processor 1220 in the apparatus 1200, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

We claim:

1. A method, comprising:
   obtaining, by a smart home system comprising one or more processors, historic operation information corresponding to smart devices in communication with the smart home system, the historic operation information indicative of a plurality of adjustments to respective settings configured on the smart devices, the historic operation information including timing information corresponding to the adjustments;
   predicting, according to the historic operation information, a location of a smart device based on a comparison of a time that a setting of the smart device was previously adjusted to a preset time interval associated with the location;
   retrieving, from a memory configured to store a plurality of preset target groups associated with respective locations, a preset target group associated with the location predicted for the smart device;
   assigning, by the smart home system, the smart device to the preset target group by storing, in the memory, an association between the smart device and the preset target group; and
   communicating, to a terminal device configured with an application to remotely control the smart devices by communication with the smart home system, the association between the smart device and the preset target group.

2. The method according to claim 1, wherein assigning the smart device according to the preset target group comprises:
   determining whether the smart device is a grouped smart device;
   when the smart device is a grouped smart device, determining the smart device is not associated with the preset target group;
   transferring, in response to the smart device not being associated with the preset target group, the smart device from a previous group to the preset target group; and
   when the smart device is a non-grouped smart device, assigning the smart device in the preset target group.

3. The method according to claim 1, wherein assigning the smart device according to the preset target group further comprises:
   determining whether the smart device is a grouped smart device;
   when the smart device is a grouped smart device, determining a current group to which the smart device belongs is not the preset target group,
   outputting, in response to determination that the current group to which the smart device belongs is not the preset target group, regrouping prompt information descriptive of a prompt to transfer the smart device from the current group to the preset target group;
   upon receiving a first inputted instruction to transfer the smart device from the current group to the preset target group, performing a transferring operation corresponding to the first inputted instruction;
   when the smart device is a non-grouped smart device, outputting grouping prompt information descriptive of a prompt to add the smart device to the preset target group; and
   upon receiving a second inputted instruction to add the smart device to the preset target group, performing an adding operation corresponding to the second inputted instruction.

4. The method according to claim 1, further comprising:
   receiving, from the terminal device, a control command corresponding to the smart device;
   adjusting, by the smart home system, the setting on the smart device; and
   updating the historic operation information based on the control command.

5. The method according to claim 1, wherein the location comprises a room, wherein the step of predicting the location further comprises:
   identifying a room identifier corresponding to the room, the room identifier associated with the preset time interval and the preset target group.

6. The method according to claim 1, wherein the method further comprises: setting a preset group according to a setting command.

7. The method according to claim 1, wherein the historic operation information comprises at least one of the following:
   an initial time when the smart device is turned on, an end time when the smart device is turned off, a number of times operation of the smart device is controlled during a first preset time period, or an amount of energy the smart device consumed during a second preset time period.

8. An apparatus, comprising:
   one or more processors;
   a non-transitory computer-readable memory accessible to the one or more processors; and
   instructions stored in the non-transitory computer-readable memory, the instructions executable by the one or more processors to cause the one or more processors to:
   communicate, during a preset time period, a control command to a smart home system in communication with a smart device, the smart home system configured to adjust a setting of the smart device based on the control command;
   update historical operation information with the control command, the historical operation information comprising time information corresponding to the control command;
   predict a location of the smart device based on a comparison of the time information with the preset time period, the location associated with the preset time period;
   determine a preset target group corresponding to the location predicted for the smart device;

and
assign an identifier of the smart device to an identifier of the preset target group.

9. The apparatus according to claim 8, wherein the instructions are further configured to cause the one or more processors to:
determine whether the smart device is a grouped smart device;
when the smart device is a grouped smart device, determine a current group to which the smart device belongs does not corresponds to the preset target group;
in response determination that the current group to which the smart device belongs does not correspond to the preset target group, transfer the smart device from the current group to the preset target group; and
when the smart device is a non-grouped smart device, add the smart device to the preset target group.

10. The apparatus according to claim 8, wherein the instructions are further configured to cause the one or more processors to:
determine whether the smart device is a grouped smart device;
when the smart device is a grouped smart device, determine a current group to which the smart device belongs does not correspond to the preset target group;
output in response to determination that the current group to which the smart device belongs does not correspond to the preset target group, regrouping prompt information to prompt a user to select whether to transfer the smart device from the current group to the preset target group;
upon receiving an inputted instruction to transfer the smart device from the current group to the preset target group, perform a transferring operation corresponding to the instruction;
when the smart device is a non-grouped smart device, output grouping prompt information to prompt the user to select whether to add the smart device to the preset target group; and
upon receiving an inputted instruction to add the smart device to the preset target group, perform an adding operation corresponding to the instruction.

11. The apparatus according to claim 8, wherein the location comprises a room, and the instructions to cause the one or more processors to predict the location of the smart device further comprise instructions to cause the one or more processor to:
obtain an identifier of the room associated with the preset time period and the preset target group.

12. The apparatus according to claim 8, wherein the instructions are further configured to cause the one or more processors to:
display an interface comprising a plurality of identifiers corresponding to a plurality of smart devices, the plurality of identifiers grouped according to the preset target group, the plurality of identifiers including the identifier of the smart device.

13. The apparatus according to claim 8, wherein the instructions are further configured to cause the one or more processors to:
set a preset group according to a setting command.

14. The apparatus according to claim 8, wherein the historic operation information comprises at least one of the following:
an initial time when the smart device is turned on, an end time when the smart device is turned off, a number of times that operation of the smart device is controlled during a first preset time period, or an amount of energy the smart device consumed during a second preset time period.

15. A non-transitory computer-readable storage medium comprising a plurality of instructions executable by a processor, the instructions comprising:
instructions executable by the processor to receive, during a preset time period, a control command corresponding to a smart device;
instructions executable by the processor to control, during the preset time period, the smart device in accordance with the control command;
instructions executable by the processor to record the control command as historic operation information, the historical operation information comprising time information corresponding to the control command;
instructions executable by the processor to predict a location of the smart device based on a comparison of the time information with the preset time period, the location associated with the preset time period;
instructions executable by the processor to determine a preset target group corresponds to the location predicted for the smart device; and
instructions executable by the processor to group the smart device according to the preset target group.

16. The non-transitory computer-readable storage medium according to claim 15, wherein the instructions executable by the processor to group further comprise:
instructions executable by the processor to communicate, to a terminal device, a prompt interface comprising a prompt, the prompt comprising an identifier of the preset target group;
instructions executable by the processor to receive a command from the terminal device based on an interaction with the prompt interface; and
instructions executable by the processor to assign, in response to receipt of the command, an identifier of the smart device to an identifier of the preset target group.

17. The non-transitory computer-readable storage medium according to claim 15, wherein the instructions executable by the processor to predict the location further comprises:
instructions executable by the processor to obtain an identifier of a room associated with the preset time period and the preset target group, the smart device configured to control operation of an electrical device in the room.

18. The non-transitory computer-readable storage medium according to claim 15, wherein the historic operation information comprises at least one of the following:
an initial time when the smart device is turned on, an end time when the smart device is turned off, a number of times operation of the smart device is controlled during a first preset time period, an amount of energy the smart device consumed during a second preset time period.

19. The apparatus according to claim 8, wherein the instructions are further executable to cause the one or more processors to:
generate the control command in response to an interaction with an application, the control command executed to cause the smart device to control operation of an electrical device, the control command comprising an instruction to turn on the electrical device or an instruction to turn off the electrical device.

20. The non-transitory computer-readable storage medium according to claim 15, wherein the instructions executable by the processor to control the smart device further comprises:

instructions executable by the processor to cause the smart device to control an electrical device according to the control command, the control command comprising an instruction to activate the electrical device during the preset time period.

* * * * *